(12) United States Patent
Fujii

(10) Patent No.: US 7,529,830 B2
(45) Date of Patent: May 5, 2009

(54) STORAGE SYSTEM AND COMMUNICATION CONTROL METHOD

(75) Inventor: Hirokazu Fujii, Nishitokyo (JP)

(73) Assignee: Hitachi, Ltd., Tokyo (JP)

( * ) Notice: Subject to any disclaimer, the term of this patent is extended or adjusted under 35 U.S.C. 154(b) by 474 days.

(21) Appl. No.: 11/486,913

(22) Filed: Jul. 13, 2006

(65) Prior Publication Data

US 2007/0271391 A1    Nov. 22, 2007

(30) Foreign Application Priority Data

May 22, 2006    (JP)    ............... 2006-141138

(51) Int. Cl.
*G06F 15/173* (2006.01)
(52) U.S. Cl. ............... 709/224; 709/240; 709/207; 711/158
(58) Field of Classification Search ............... 709/223, 709/224, 240, 207, 217, 232; 711/154, 158, 711/170; 710/10
See application file for complete search history.

(56) References Cited

U.S. PATENT DOCUMENTS

| | | | |
|---|---|---|---|
| 6,834,326 B1 * | 12/2004 | Wang et al. | 711/114 |
| 7,073,036 B2 * | 7/2006 | Furuya et al. | 711/162 |
| 2005/0267986 A1 | 12/2005 | Murakami et al. | |
| 2006/0221824 A1 * | 10/2006 | Anzai | 370/229 |
| 2006/0224764 A1 * | 10/2006 | Shinohara et al. | 709/232 |
| 2007/0043737 A1 * | 2/2007 | Nagamatsu et al. | 707/10 |

FOREIGN PATENT DOCUMENTS

| | | |
|---|---|---|
| JP | 2002-244899 A | 8/2002 |
| JP | 2005-323245 A | 11/2005 |

* cited by examiner

*Primary Examiner*—Philip B Tran
(74) *Attorney, Agent, or Firm*—Sughrue Mion, PLLC

(57) ABSTRACT

A storage system includes: a protocol control unit that processes a file access request from a NAS client; and a priority calculation unit that calculates a priority set for the reply packet returned to the NAS client as a response to the file access request from the NAS client, based on a priority set in advance for the access area that is the target of the file access request.

8 Claims, 14 Drawing Sheets

FIG.8

MANAGEMENT TABLE 30

| # | ACCESS AREA (FOLDER NAME/ VOLUME NAME) | LU | RAID GROUP | PRIORITY | PROTOCOL | CoS CONTROL | CONFIGURATION INFORMATION | | MONITORING PARAMETER |
|---|---|---|---|---|---|---|---|---|---|
| | | | | | | | RAID LEVEL | DEVICE TYPE | |
| 1 | FOLDER 1 | LU1 | Group1 | 1 | NFS/CIFS | DSCP | 1 | FC | RESPONSE TIME |
| 2 | VOLUME 2 | LU2 | Group2 | 3 | FTP | Precedence | 5 | FC | RESPONSE TIME |
| 3 | VOLUME 3 | LU3 | Group3 | 2 | iSCSI | CoS | 6 | SATA | REPLICATION EXECUTION |

| FAILURE INFORMATION | | | | LOAD INFORMATION | | | |
|---|---|---|---|---|---|---|---|
| DEVICE FAILURE | CONTROLLER FAILURE | CACHE FAILURE | CLUSTER FAILOVER | RESPONSE | REPLICATION EXECUTION | CPU UTILIZATION | BACKUP EXECUTION |
| NO | NO | NO | NO | 5mS | NO | 40% | NO |
| NO | NO | NO | NO | 10mS | NO | 90% | NO |
| NO | NO | NO | NO | 5mS | YES | 10% | NO |

FIG.9

PRIORITY CALCULATION TABLE 31

| TRANS-MISSION SOURCE ADDRESS | TOS VALUE/ COS VALUE | PRIORITY VALUE | CONFIGURATION INFORMATION | | FAILURE INFORMATION | | | | LOAD INFORMATION | | | |
|---|---|---|---|---|---|---|---|---|---|---|---|---|
| | | | RAID LEVEL | DEVICE TYPE | DEVICE FAILURE | CONTROLLER FAILURE | CACHE FAILURE | CLUSTER FAILOVER | RESPONSE | REPLICATION EXECUTION | CPU UTILIZATION | BACKUP EXECUTION |
| 192.168. 255.255 | 1 | 3 | 5 | FC | NO | NO | NO | NO | 10mS | NO | 90% | NO |

STORAGE SYSTEM AND COMMUNICATION CONTROL METHOD

CROSS-REFERENCES TO RELATED APPLICATIONS

This application relates to and claims the benefit of priority from Japanese Patent Application No. 2006-141138, filed on May 22, 2006, the entire disclosure of which is incorporated herein by reference.

DESCRIPTION OF THE INVENTION

1. Field of the Invention

The invention generally relates to a storage system and a communication control method, and more specifically to transmission priority control for packets transmitted from a storage system to a client.

2. Description of Related Art

Disk array systems have been used as storage systems for managing large amounts of data. A disk array system, which has a plurality of disk drives organized in an array, provides storage resources with a RAID (Redundant Arrays of Independent/Inexpensive Disks) configuration to a host computer. In addition to a block I/O interface that processes I/O requests in blocks, such as according to FC (Fibre Channel) protocol, SCSI (Small Computer System Interface) protocol, iSCSI (internet SCSI) protocol, ESCON (Enterprise System Connection)® protocol, a file I/O interface that processes I/O requests in files, such as according to NFS (Network File System) protocol or CIFS (Common Interface File System) protocol, is used as an interface between a host computer and a disk array system.

In recent years, with an increase in the amounts of data handled by businesses, the ways in which storage systems are used became diversified. For example, a storage system having a NAS functionality that receives file access request from a NAS client via an IP network and provides file services to the NAS client has been developed. From the viewpoint of file service enhancement, the improvement of the communication quality of IP packets that travel across an IP network is being pursued. For example, laid-open Japanese patent applications No. JP-A-2002-244899 and JP-A-2005-323245 describe QoS (Quality of Service) control.

SUMMARY

The inventive methodology is directed to methods and systems that substantially obviate one or more of the above and other problems associated with conventional storage systems.

Conventionally, protocol-based QoS control have been dominant. For example, QoS control has been performed with the priority for each of NFS protocol, CIFS protocol, and NFS protocol set in advance. This type of QoS control makes it possible to set the priority of reply packets for NFS protocol-based file access to be higher than the priority of reply packets for CIFS protocol-based file access.

However, the emergence of file services using a NAS server brings about the necessity for independently controlling the QoS of reply packets for different file access requests using the same protocol. For example, it is desirable that the priority set for a reply packet for an access request targeting a folder with a high level of importance from a NAS client be higher than the priority set for a reply packet targeting a folder with a low level of importance from another NAS client.

Therefore, an aspect of the present invention provides a storage system and a communication control method which independently control the QoS of reply packets for different access requests that use the same protocol.

The storage system according to an aspect of the present invention is a storage system configured to process an access request from a client, including a priority calculation unit that calculates a priority set for a reply packet returned to the client as a response to the access request from the client, based on a priority set in advance for the access area that is the target of the access request.

The storage system according to another aspect of the present invention is a storage system configured to process an access request from a client, including a priority calculation unit that calculates a priority set for a reply packet returned to the client as a response to the access request from the client, based on status information on the storage system.

Here, the status information includes any of configuration information on one or more storage devices that provide the access area, load information on the storage system, and failure information on the storage system.

The priority calculation unit, upon occurrence of a failure in the storage system, sets the priority of the reply packet to be lower than a value, which is set when no failure occurs in the storage system. This calculation method is preferable for an operation method in which, assuming that access is delayed during the occurrence of a failure in a storage system, the delay cannot be compensated by even raising the priority of the reply packet.

The priority calculation unit, upon occurrence of a failure in the storage system, sets the priority of the reply packet to be higher than the value, which is set when no failure occurs in the storage system. This calculation method is preferable for an operation in which, upon the occurrence of a failure in a storage system, the delay in access is compensated for by raising the priority of the reply packet.

An communication control method according to an embodiment of the preset invention includes the steps of: receiving an access request from a client; calculating a priority set for a reply packet returned to the client as a response to the access request from the client, based on a priority set in advance for an access area that is the target of the access request; and returning the reply packet to the client.

An embodiment of the present invention makes it possible to independently control the QoS of reply packets for different access requests that use the same control.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 8 is an explanatory diagram of a management table.

FIG. 9 is an explanatory diagram of a priority calculation table.

DETAILED DESCRIPTION OF PREFERRED EMBODIMENTS

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
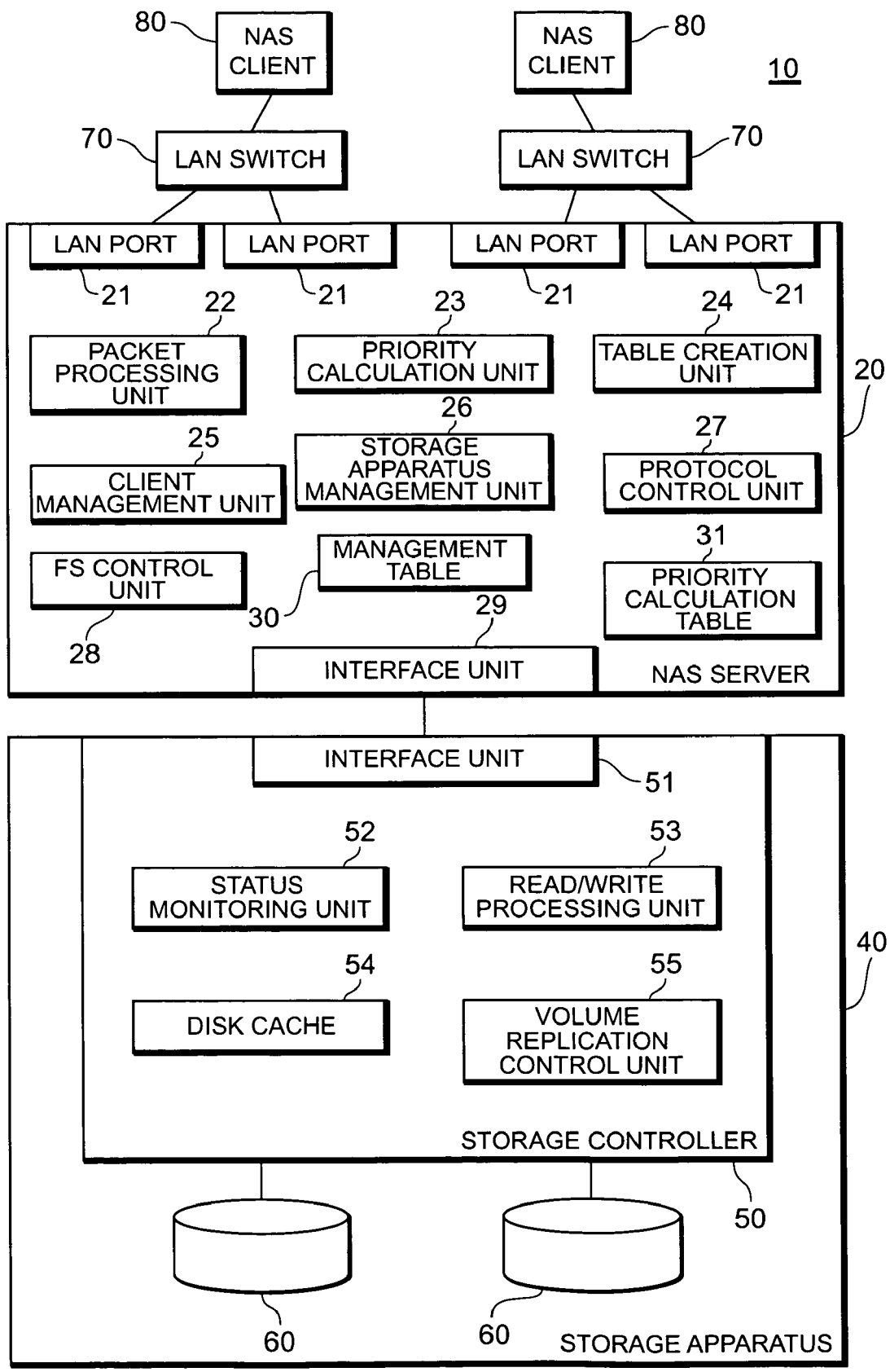
FIG. 1 is a diagram showing functional blocks of a storage system according to an embodiment of the present invention.

FIG. 1 shows functional blocks of a storage system 10 according to an embodiment of the present invention. The storage system 10 chiefly includes a NAS server 20 and a storage apparatus 40. The NAS server 20 is connected to one or more NAS clients 80 via the respective LAN switches 70. Each of the aforesaid LAN switches is provided with a LAN (Local Area Network) that enables data communication based on TCP/IP (Transmission Control Protocol/Internet Protocol), or any other IP (Internet Protocol) network. A LAN switch 70 is an L3 switch that performs routing control for IP packets transmitted between the NAS clients 80 and the NAS server 20 at the layer 3 level. In an embodiment of the system, an L2 switch may be used in place of the L3 switch.

A NAS client 80 makes file access requests to the storage system 10 in accordance with a file transfer protocol such as NFS, CIFS, and FTP. The NAS clients 80 may include personal computers, work stations, and mainframe computers and the like.

A NAS server 20 functions as an adapter that controls data input/output (I/O) operations between the NAS clients 80 and the storage apparatus 40. The NAS server 20 receives a file access request sent from a NAS client 80, and sends an I/O request according to the received file access request to the storage apparatus 40. The I/O request specifies an access type that distinguishes between write access and read access. For example, the NAS server 20, upon write access from a NAS client 80, sends an I/O request containing the write data sent from the NAS client 80 and specifying the 'write' access type to the storage apparatus 40. Similarly, the NAS server 20, upon read access from a NAS client 80, sends an I/O request containing the 'read' access type to the storage apparatus 40, and then sends read data obtained from the storage apparatus 40 to the NAS client 80 in files.

The NAS server 20 includes LAN ports 21, a packet processing unit 22, a priority calculation unit 23, a table creation unit 24, a client management unit 25, a storage apparatus management unit 26, a protocol control unit 27, a file system control unit 28, an interface unit 29, a management table 30, and a priority calculation table 31.

The LAN ports 21 function as communication interfaces configured to connect the NAS clients 80 and the NAS server 20.

The packet processing unit 22 executes the processing associated with receiving an IP packet sent from a NAS client 80 to the NAS server 20, and also the processing associated with sending an IP packet from the NAS server 20 to a NAS client 80.

The priority calculation unit 23 calculates the priority of an IP packet sent from the NAS server 20 to a NAS client 80. The details of priority calculation processing (see FIG. 16) will be described below.

The table creation unit 24 creates a priority calculation table 31. The details of the priority calculation table 31 (see FIG. 9) and the creation processing (see FIGS. 10 to 15) will be described below.

The client management unit 25 manages file access requests in accordance with the identity of the NAS client 80 from which each file access request has been received.

The storage apparatus management unit 26 manages information on the storage apparatus 40, such as load information and failure information, and the like.

The protocol management unit 27 processes file transfer protocols such as NFS, CIFS, and FTP.

The file system control unit 28 manages the correspondence between folders and logical units.

The interface unit 29 controls data communication between the NAS server 20 and the storage apparatus 40.

The details of the management table 30 (see FIG. 8) will be described below.

The storage apparatus 40 mainly includes a storage controller 50 and a plurality of storage devices 60. The storage controller 50 can be controlled at a defined RAID level (e.g., 0, 1, 4, or 5).

The storage controller 50 includes an interface unit 51, a status monitoring unit 52, a read/write processing unit 53, disk cache 54, and a volume replication control unit 55.

The interface unit 51 functions as a communication interface to connect the storage apparatus 40 and the NAS server 20.

The status monitoring unit 52 manages the storage apparatus 40 failure information and load information. The failure information includes information concerning the existence or non-existence of failures in the storage devices 60, the existence or non-existence of failures in the storage controller 50, the existence or non-existence of failures in the disk cache 54, and the existence or non-existence of cluster failovers. The load information includes the response time required for I/O processing, execution/non-execution of copy processing information, execution/non-execution of backup processing information, and CPU utilization information.

The read/write processing unit 53 controls read/write processing from/to the storage devices 60.

The disk cache 54 is cache memory that temporarily stores data read/written from/to the storage devices 60.

The volume replication control unit 55 controls volume replication processing and backup processing.

The storage devices 60 are implemented as, for example, physical devices, such as hard disk drives, flexible disk drives, magnetic tape drives, semiconductor memory drives, flash memory, or optical disk drives. For hard disk drives, FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SCSI (Small Computer System Interface) disk drives, etc., may be used.

If the storage system 10 has an iSCSI server, it can accept block access requests from iSCSI clients instead of the NAS clients 80.

Figure 2:
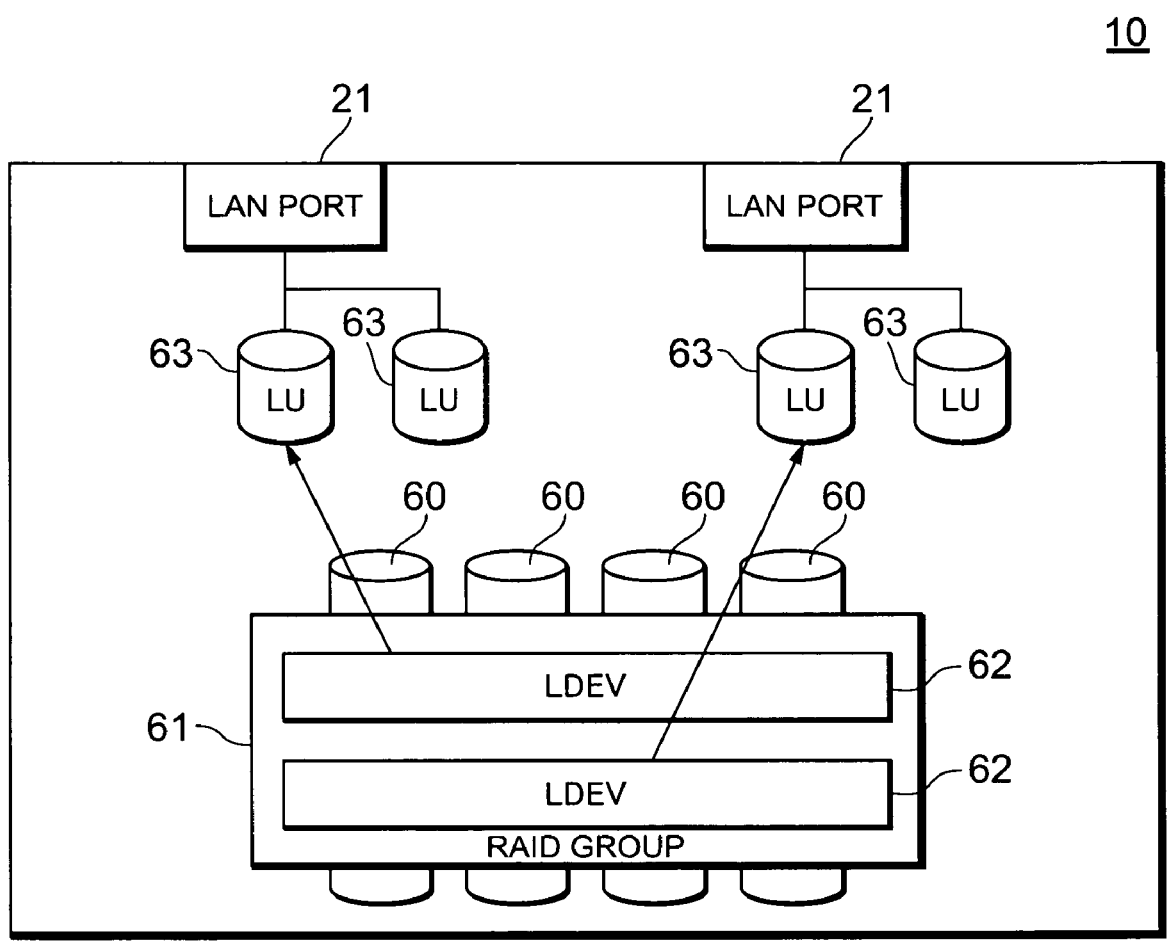
FIG. 2 is an explanatory diagram of storage tiers of a storage system.

FIG. 2 shows storage tiers in the storage system 10. Devices, as well as other elements shown in FIG. 2, which have the same reference numerals as those shown in FIG. 1 are the same elements as in FIG. 1, and, therefore, a detailed description of those devices will not be repeated.

A RAID group 61 consists of a group of four storage devices 60 (3D+1P), or a group of eight storage devices 60 (7D+1P). In other words, a RAID group 61 consists of a collection of storage areas provided by a plurality of storage devices 60. The RAID group 61 may also be referred to as a parity group, or an ECC group.

A plurality of logical devices 62 can be formed by dividing one RAID group 61 into multiple parts, and one logical device 62 may also be formed from a plurality of RAID groups 61.

Each LAN port 21 is assigned one or more logical units 63. A logical unit 63 is a logical storage area unit recognized by the NAS clients 80. For example, if the NAS clients 80 are UNIX®-based systems, the logical units 63 are associated with device files. If the NAS clients 80 are Windows®-based systems, the logical units 63 are associated with drive letters (drive names). Each logical unit 63 is assigned an LUN (logical unit number).

Single or multiple logical devices 62 are mapped onto each logical unit 63. If the NAS clients are open systems, they recognize the logical devices 62 as one physical device, and access a desired logical device 62 by designating the LUN or the logical block address. If the NAS clients 80 are mainframe systems, they directly recognize the logical devices 62.

Figure 3:
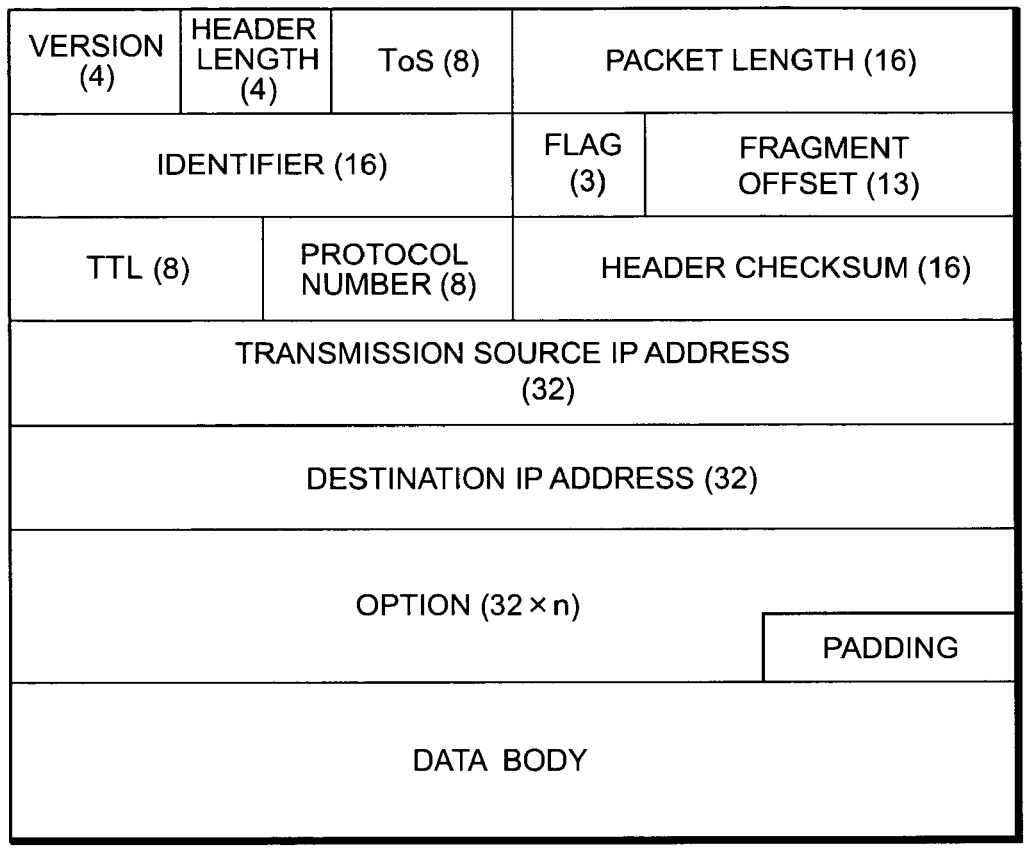
FIG. 3 is an explanatory diagram of an IPv4 packet format.

FIG. 3 shows an IPv4 packet format transmitted between the NAS clients 80 and the NAS server 20. An IPv4 packet includes a version number field (4 bits), a header length field (4 bits), a ToS (Time of Service) field (8 bits), a packet length field (16 bits), an identifier field (16 bits), a flag field (3 bits), a fragment offset field (13 bits), a TTL (Time to live) field (8 bits), a protocol number field (8 bits), a header checksum field (16 bits), a transmission source IP address (32 bits), a destination IP address (32 bits), an option field (32×n bits), a padding (variable length bits), and a data body.

Figure 4:
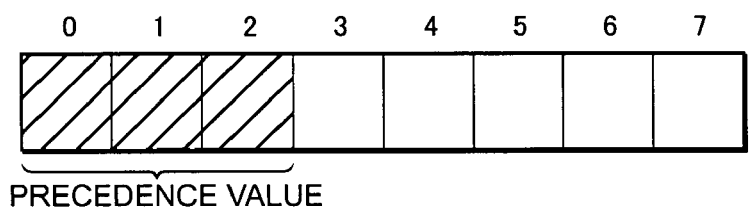
FIG. 4 is an explanatory diagram of a precedence value.
Figure 5:
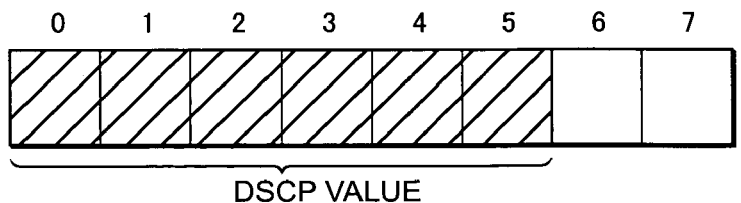
FIG. 5 is an explanatory diagram of a DSCP value.

The data body of the IPv4 packet stores information that identifies an access area and an access command (read command/write command). The ToS field stores, for example, a precedence value having a 3-bit value shown in FIG. 4, or a DSCP (Differentiated Services Codepoint) value having a 6-bit value shown in FIG. 5, as a TOS value used to perform the priority control for an IP packet at a layer 3 level.

The protocol version of an IP packet transmitted between the NAS clients 80 and the NAS server 20 is not limited to version 4, and any version that can perform the QoS control of the IP packet may be used. For example, in an embodiment of the invention, version 6 may be used.

Figure 6:
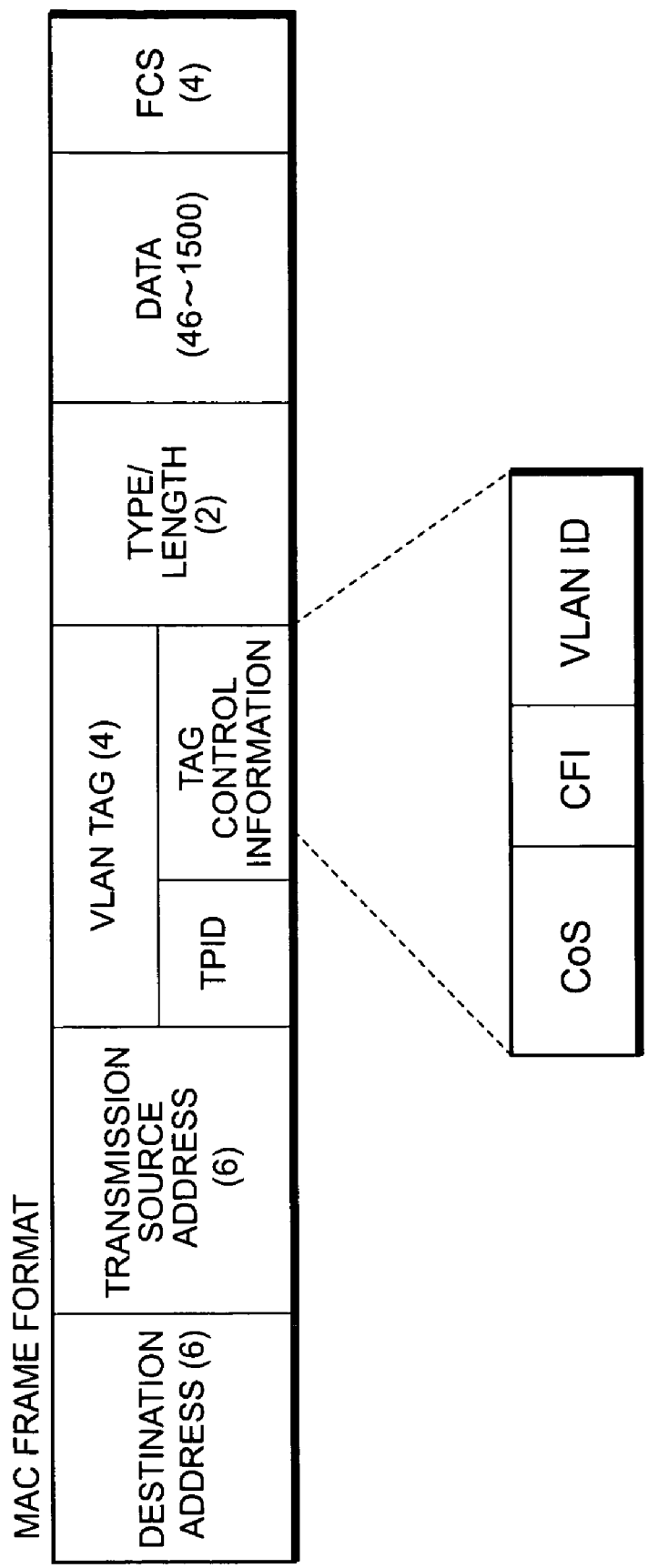
FIG. 6 is an explanatory diagram of a MAC frame format.

FIG. 6 shows a MAC (Media Access Control) frame format transmitted between the NAS clients 80 and the NAS server 20. The MAC frame includes a destination MAC address (6 bytes), a transmission source MAC address (6 bytes), a VLAN (Virtual Local Area Network) tag field (4 bytes), a type/length field (2 bytes), a data field (46-1500 bytes), and a FCS (Frame Check Sequence) field (4 bytes).

The data field includes the aforementioned IPv4 packet. The VLAN tag field is an option field added to the MAC frame when a VLAN is used as an IP network that connects the NAS clients 80 and the NAS server 20. The VLAN is a network in which the ports (or MAC addresses) in one switching hub are formed into several groups, and each group functions as an independent LAN (broadcast domain).

Figure 7:
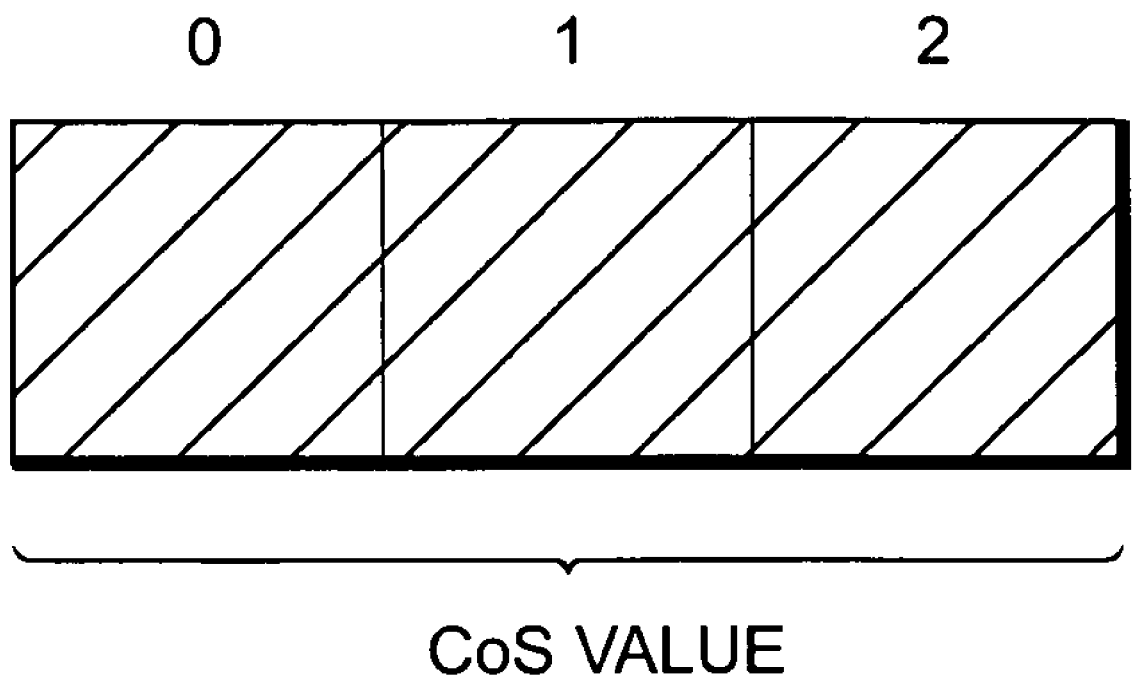
FIG. 7 is an explanatory diagram of a CoS value.

The VLAN tag field stores a TPID (Tag Protocol Identifier) field, and a tag control information field. The tag control information field stores a CoS (Class of Service) value, a CFI (Canonical Format Indicator), and VLAN ID. The CoS value is information that is used to perform the priority control for a MAC frame at a layer 2 level, and it has a 3-bit value shown in FIG. 7.

FIG. 8 shows the exemplary structure of the management table 30. The management table 30 holds one or more entries associated with the respective storage areas accessed by the NAS clients 80 (hereinafter referred to as "access area"). An access area is a logical storage area unit recognized by the NAS clients 80, and is, for example, a folder or a logical volume. Each entry associates "#," "ACCESS AREA," "LU," "RAID GROUP," "PRIORITY," "PROTOCOL," "QoS CONTROL," "CONFIGURATION INFORMATION," "MONITORING PARAMETER," "FAILURE INFORMATION," and "LOAD INFORMATION" for each entry.

The "#" column stores numbers for identifying the entries. The "ACCESS AREA" column stores folder names or volume names corresponding to access areas. The "LU" column stores the numbers for logical units (LUNs) that provide access areas. The "RAID GROUP" column stores the numbers for RAID groups the access areas belong to. The "PRIORITY" column stores the priorities set for the access areas. If a priority is not set for an access area, "NO" is stored in the column. The "PROTOCOL" column stores the names of communication protocols that execute the QoS control. The FIG. 8 example shows that the QoS control is executed when a NAS client 80 accesses folder 1 according to NFS or CIFS protocol.

The "QoS CONTROL" column stores information indicating which information from among the ToS value (precedence value or DSCP value) and the CoS value is used to execute the QoS control. The FIG. 8 example shows that when a NAS client 80 accesses volume 2, the QoS control is executed using the precedence value. The "CONFIGURATION INFORMATION" column stores "RAID LEVELs" and "DEVICE TYPEs." The "RAID LEVEL" column stores the RAID levels of the RAID groups the access areas belong to. The "DEVICE TYPE" column stores the types of storage devices 60. For example, if a storage device 60 is a hard disk drive, the "DEVICE TYPE" column stores information indicating whether the storage device 60 is an FC disk or a SATA disk.

The "MONITORING PARAMETER" column stores information indicating which information from among the later-described load information (response time, execution/non-execution of replication information, CPU utilization information, and execution/non-execution of backup information) is used to execute the QoS control. The FIG. 8 example shows that when a NAS client 80 accesses volume 3, the QoS control is executed using the execution/non-execution of replication information as load information.

The "FAILURE INFORMATION" column stores "DEVICE FAILURE," "CONTROLLER FAILURE," "CACHE FAILURE," and "CLUSTER FAILOVER." The "DEVICE FAILURE" column stores information indicating whether the storage devices 60 have any failures. The "CONTROLLER FAILURE" column stores information indicating whether the storage controller 50 has any failure. The "CACHE FAILURE" column stores information indicating whether the disk cache 54 has any failure. The "CLUSTER FAILOVER" column stores information indicating whether any cluster failover has occurred.

The "LOAD INFORMATION" column stores "RESPONSE," "REPLICATION EXECUTION," "CPU UTILIZATION," and "BACKUP EXECUTION." The "RESPONSE" column stores response times required by the storage system 10 to respond to file access requests from the NAS clients 80. The "REPLICATION EXECUTION" column stores information indicating whether the storage apparatus 40 has executed replication processing for the volumes. The "CPU UTILIZATION" column stores the CPU utilization of the storage controller 50. The "BACKUP EXECUTION" column stores information indicating whether the storage apparatus 40 has executed backup processing for the volumes.

FIG. 9 shows the table structure of the priority calculation table 31. The priority calculation table 31 stores information for calculating the priorities set for the IP packets returned by the NAS server 20 to the NAS clients 80 in response to file access requests from the NAS clients 80. The priority calculation table 31 holds one or more entries associated with the respective access areas accessed by the NAS clients 80. Each entry associates "TRANSMISSION SOURCE ADDRESS," "ToS VALUE/CoS VALUE," "PRIORITY," "CONFIGURATION INFORMATION," "FAILURE INFORMATION," AND "LOAD INFORMATION" for each entry.

The "TRANSMISSION SOURCE ADDRESS" column stores addresses to which IP packets are returned in response to file access requests from the NAS clients 80 (IP addresses or MAC addresses of request source NAS clients 80).

When the priority set for an IP packet sent from the NAS server 20 to a NAS client 80 is calculated using a ToS value, the "ToS VALUE/CoS VALUE" column stores the TOS value set for the IP packet sent from the NAS client 80 to the NAS server 20 as a file access request. Meanwhile, when the priority set for a MAC frame sent from the NAS server 20 to a NAS client 80 is calculated using a CoS value, the "ToS VALUE/CoS VALUE" column stores the CoS value set for the MAC frame sent from the NAS client 80 to the NAS server 20 as a file access request.

The "PRIORITY" column stores the priorities set for the access areas that will be the targets of file access requests from the NAS clients 80. The information stored in the "CONFIGURATION INFORMATION" column, the "FAILURE INFORMATION" column, and the "LOAD INFORMATION" column is the same as the aforementioned configuration information, failure information and load information, and so that detailed explanation will not be repeated.

Next, the processing for creating the priority calculation table 31 will be described below with reference to FIGS. 10 to 15.

Figure 10:
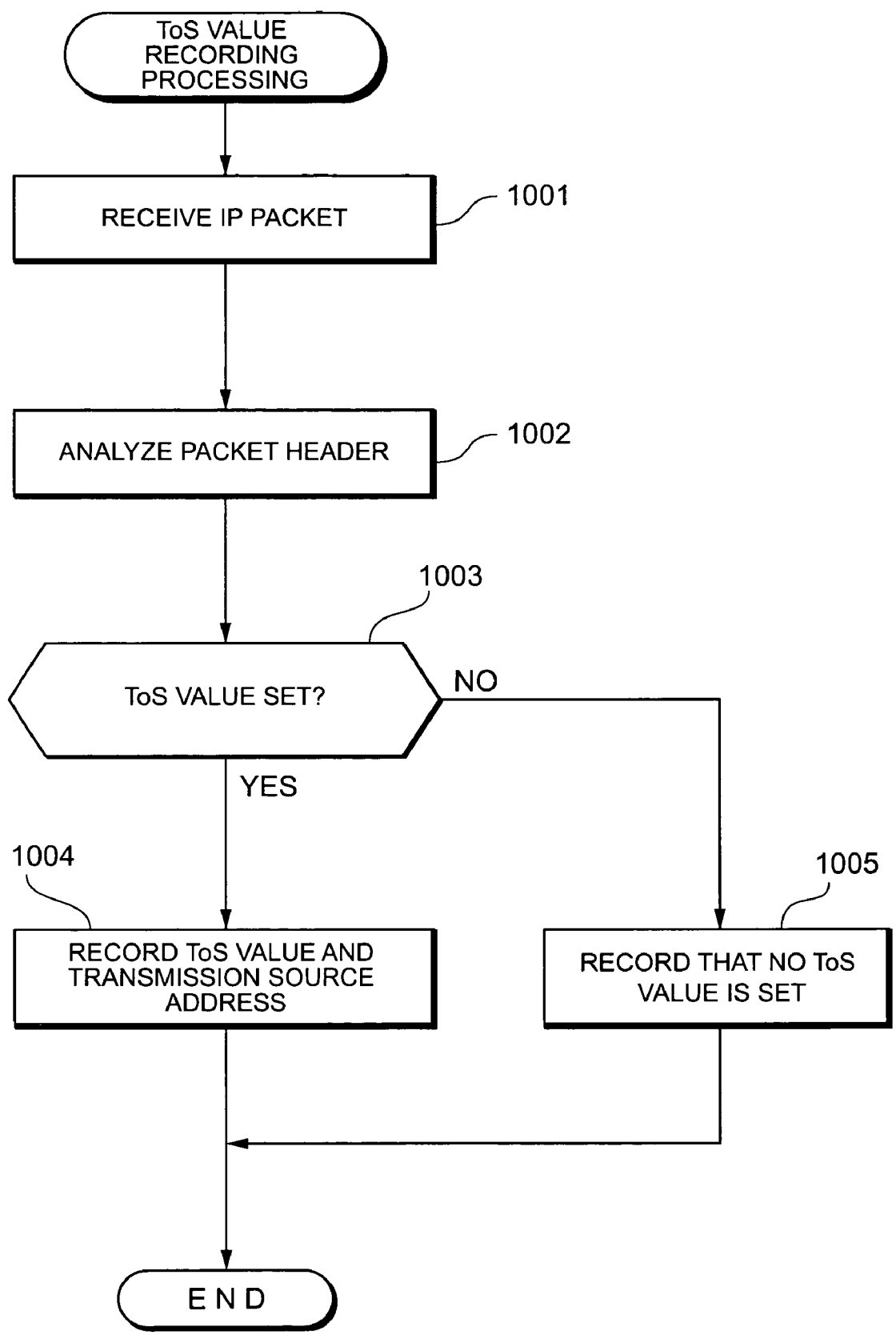
FIG. 10 is a flowchart showing a ToS value recording processing routine.

FIG. 10 shows a ToS value recording processing routine. The table creation unit 24, upon receipt of an IP packet from a NAS client 80 (step 1001), analyzes the packet header (step 1002), and determines whether a ToS value is set in the packet header (step 1003).

If a ToS value is set in the packet header (step 1003: YES), the table creation unit 24 records the ToS value and the transmission source address (the network address of the NAS client 80) in the priority calculation table 31 (step 1004).

Meanwhile, if a ToS value is not set in the packet header (step 1003: NO), the table creation unit 24 records, in the priority calculation table 31, that no ToS value is set (step 1005).

Figure 11:
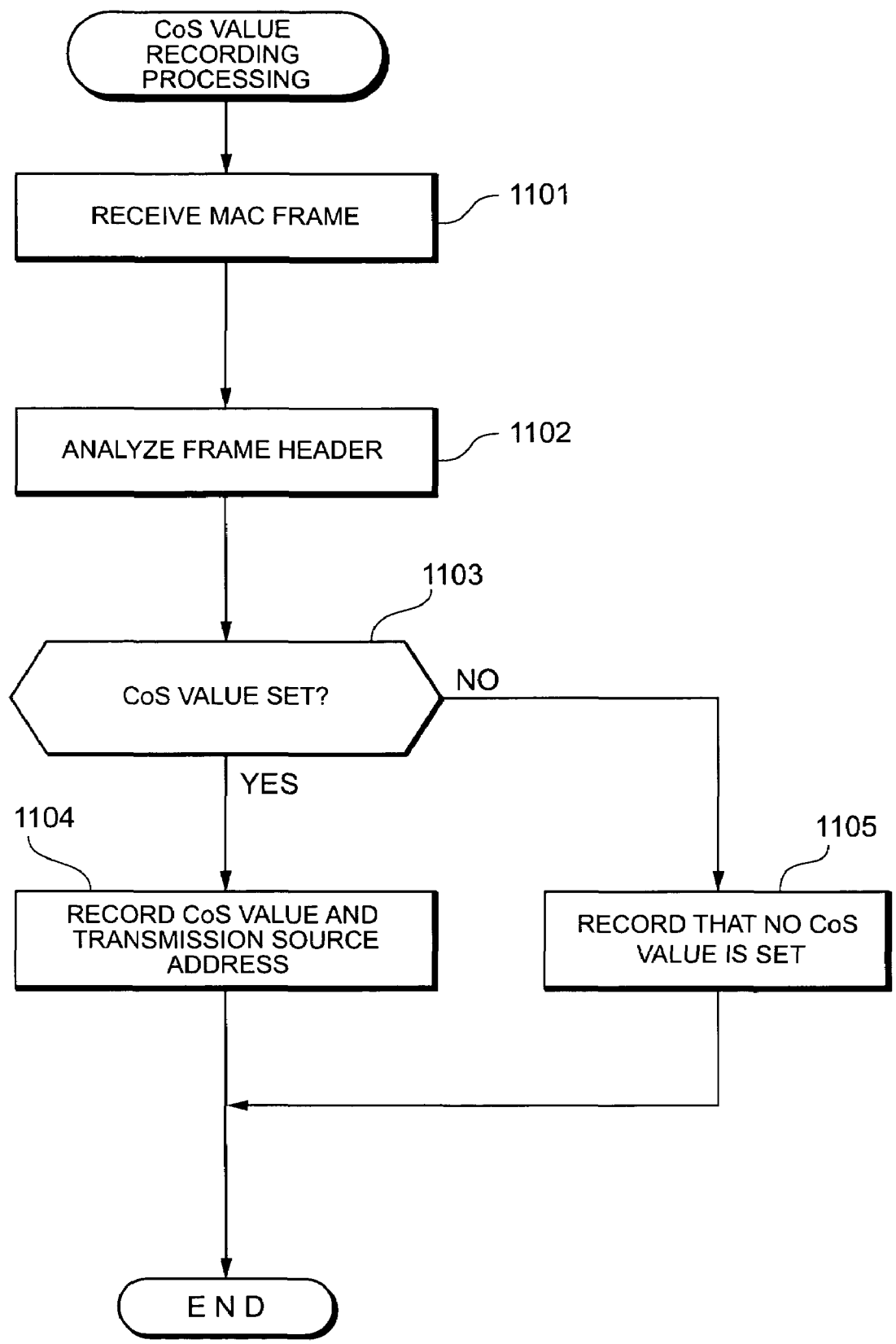
FIG. 11 is a flowchart showing a CoS value recording processing routine.

FIG. 11 shows a CoS value recording processing routine. The table creation unit 24, upon receipt of a MAC frame from a NAS client 80 (step 1101), analyzes the frame header (step 1102), and determines whether a CoS value is set in the frame header (step 1103).

If a CoS value is set in the frame header (step 1103: YES), the table creation unit 24 records the COS value and the transmission source address (the network address of the NAS client 80) in the priority calculation table 31 (step 1104).

Meanwhile, if a CoS value is not set in the frame head (step 1103: NO), the table creation unit 24 records, in the priority calculation table 31, that no CoS value is set (step 1105).

Figure 12:
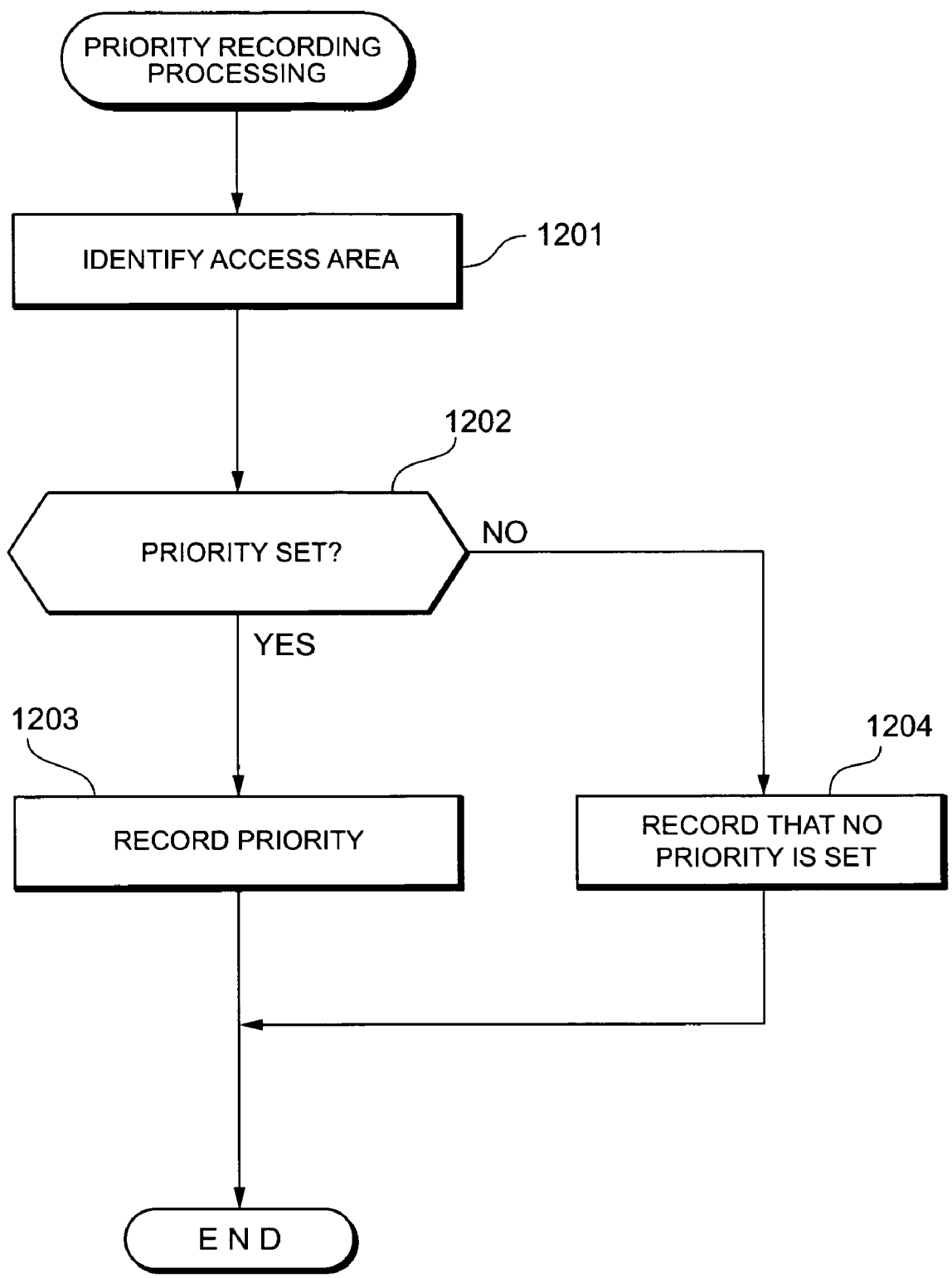
FIG. 12 is a flowchart showing a priority recording processing routine.

FIG. 12 shows a priority recording processing routine. The table creation unit 24 identifies the access area that is the target of a file access request from a NAS client 80 (step 1201), and determines whether a priority is set for that access area, with reference to the management table 30 (step 1202).

If a priority is set for the access area (step 1202: YES), the table creation unit 24 records the priority set for the access area (step 1203).

Meanwhile, if a priority is not set for the access area (step 1202: NO), the table creation unit 24 records, in the priority calculation table 31, that no priority is set for the access area (step 1204).

Figure 13:
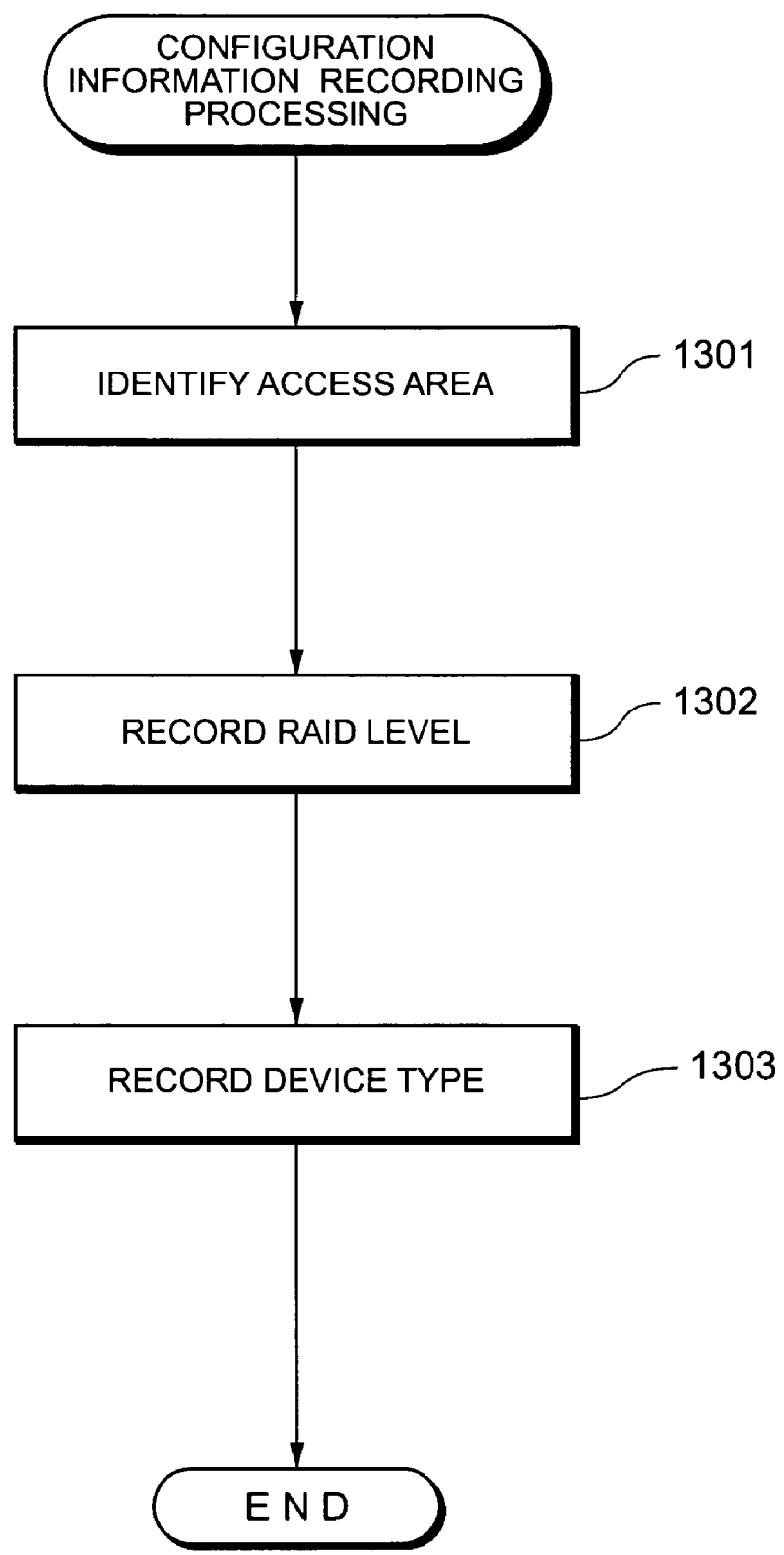
FIG. 13 is a flowchart showing a configuration information recording processing routine.

FIG. 13 shows a configuration information recording processing routine. The table creation unit 24 identifies the access area that is the target of a file access request from a NAS client 80 (step 1301), and records the RAID level of the RAID group to which the access area belongs, with reference to the management table 30 (step 1302), and records the device type of the storage devices 60 that provides the access area, in the priority calculation table 31 (step 1303).

Figure 14:
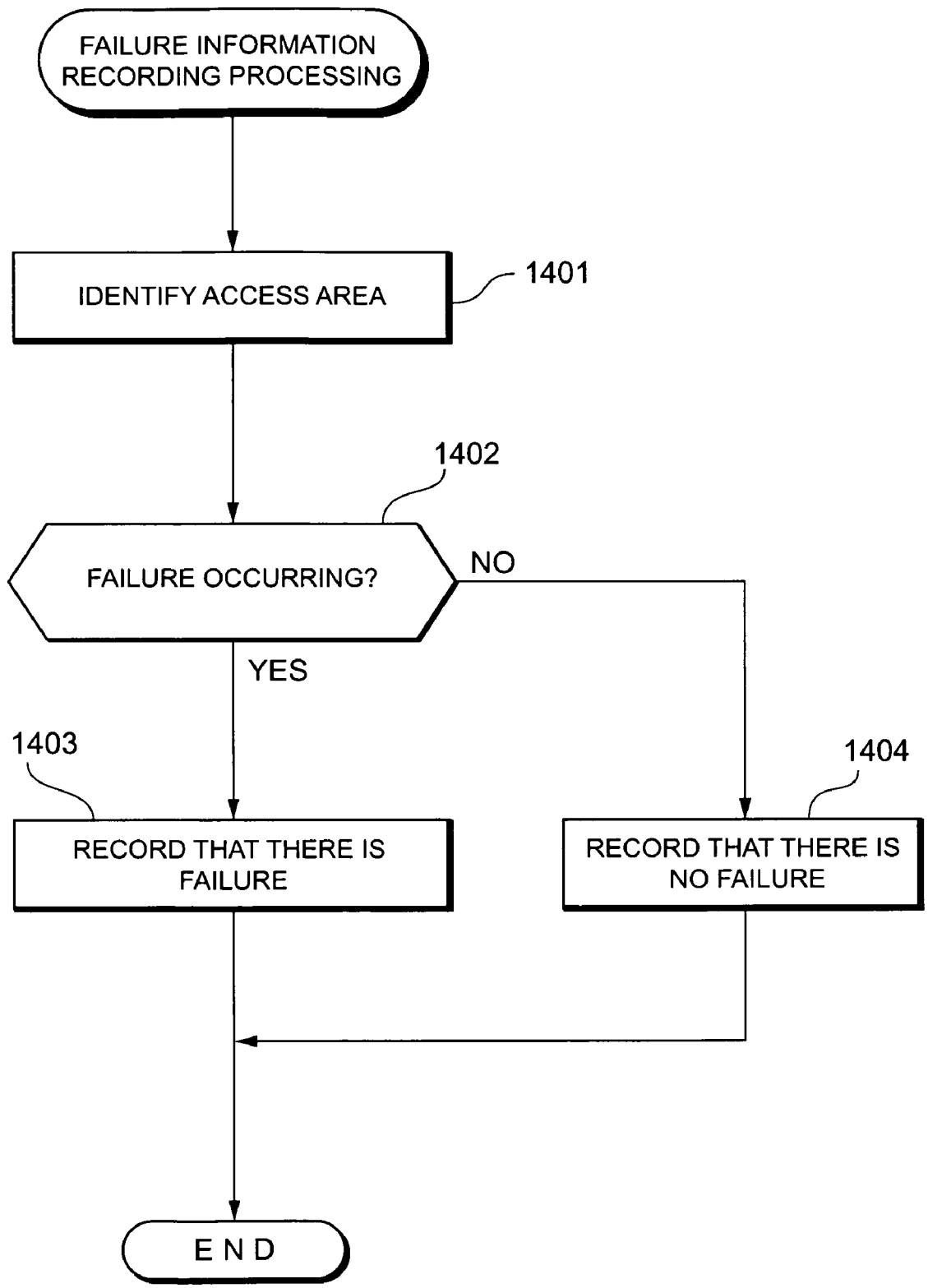
FIG. 14 is a flowchart showing a failure information recording processing routine.

FIG. 14 shows a failure information recording processing routine. The table creation unit 24 identifies the access area that is the target of a file access request from a NAS client 80 (step 1401), and determines whether any failure relating to the access area (device failure, controller failure, cache failure, and cluster failover) has occurred, with reference to the management table 30 (step 1402).

If a failure relating to the access area has occurred (step 1402: YES), the table creation unit 24 records, in the priority calculation table 31, that a failure has occurred (step 1403).

If a failure relating to the access area has not occurred (step 1402: NO), the table creation unit 24 records, in the priority calculation table 31, that no failure has occurred (step 1404).

Figure 15:
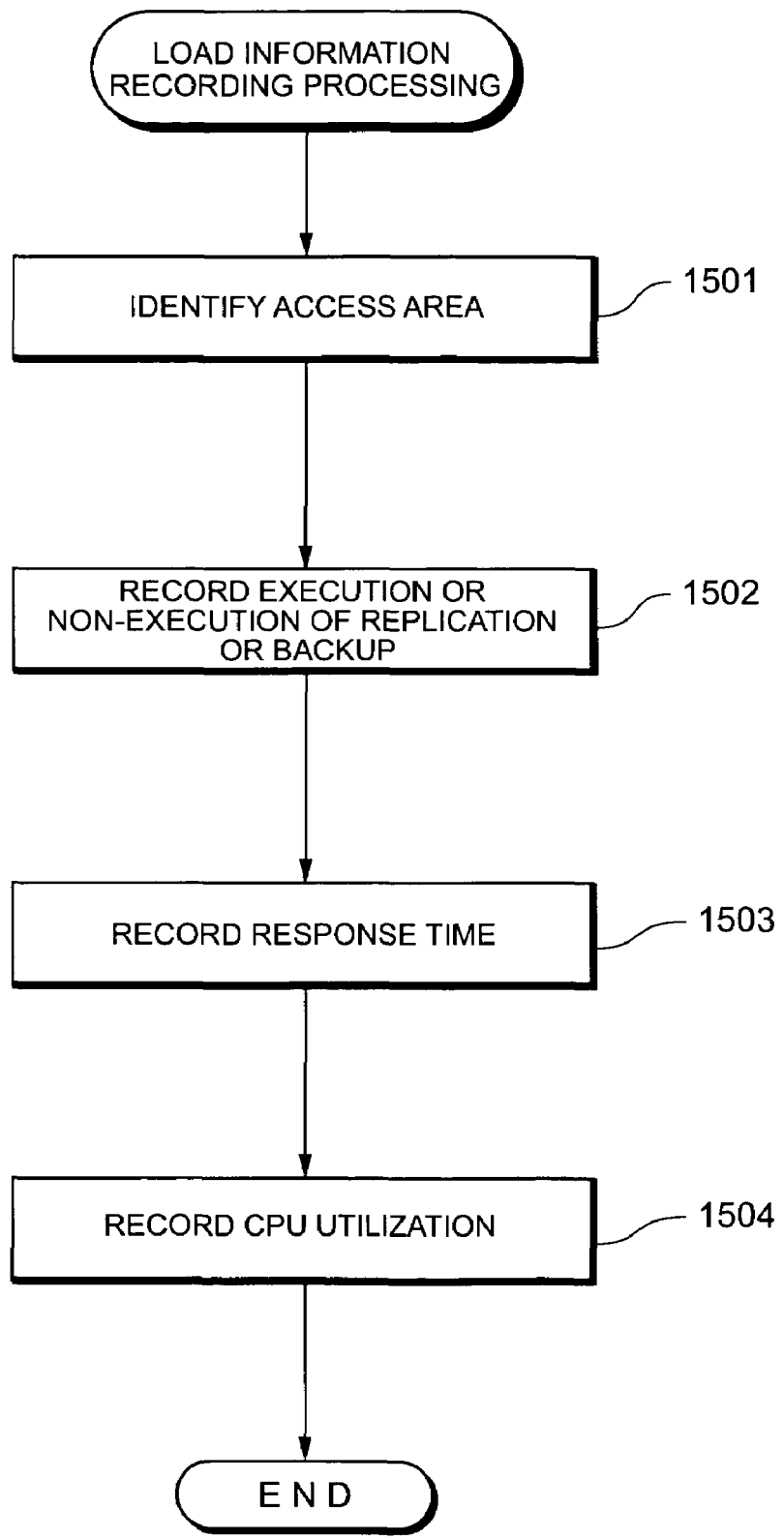
FIG. 15 is a flowchart showing a load information recording processing routine.

FIG. 15 illustrates a load information recording processing routine. The table creation unit 24 identifies the access area that is the target of a file access request from a NAS client 80 (step 1501), and records execution/non-execution of replication information, or execution/non-execution of backup information for the access area in the priority calculation table 31 with reference to the management table 30 (step 1502).

The table creation unit 24 records the response time relating to the access area in the priority calculation table 31 (step 1503), and also records the CPU utilization relating to the access area in the priority calculation table 31 (step 1504).

Figure 16:
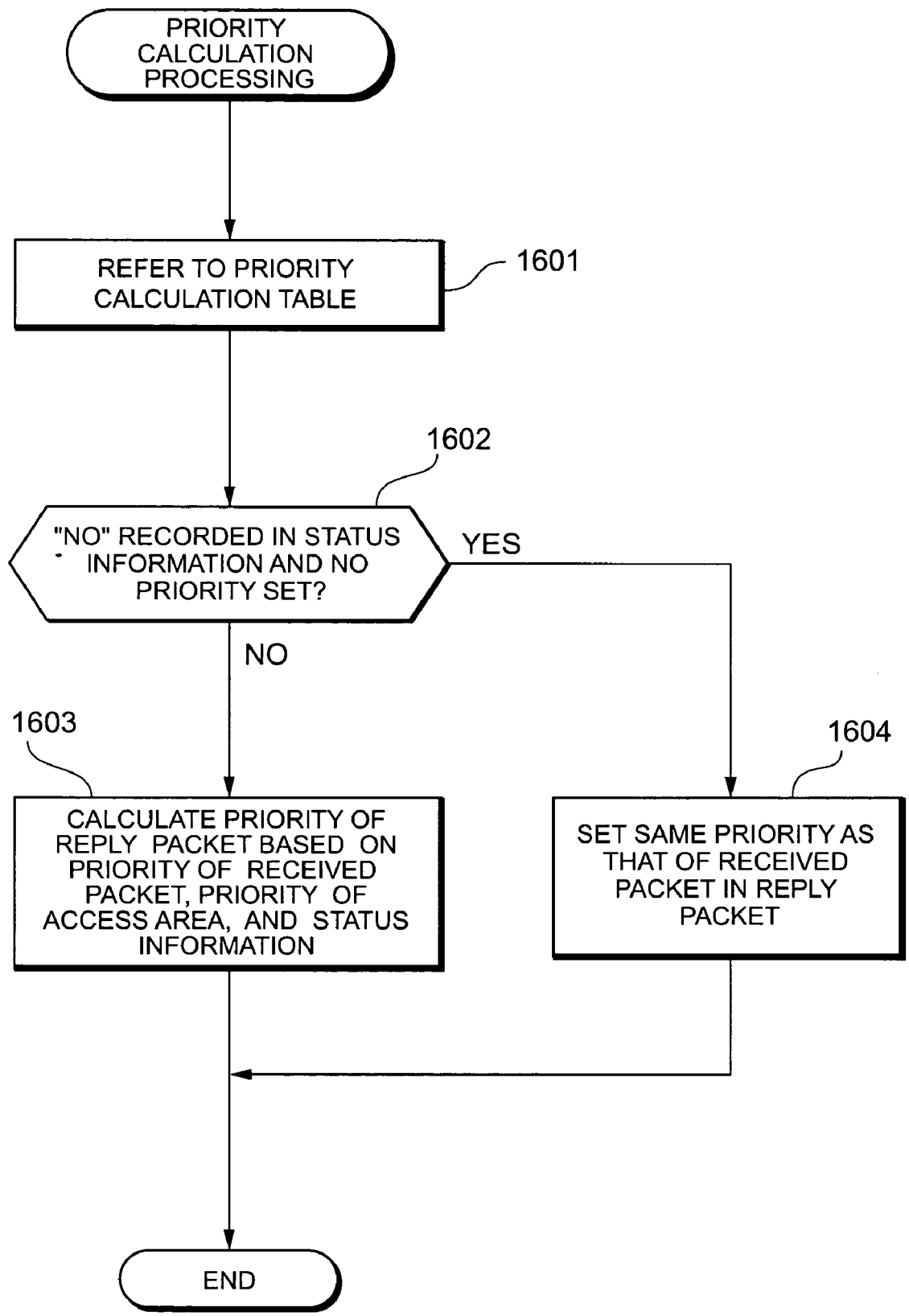
FIG. 16 is a flowchart showing a priority calculation processing routine.

Next, priority calculation processing will be described with reference to FIG. 16. The priority calculation unit 23 calculates a ToS value set for an IP packet (or a CoS value set for a MAC frame) returned from the NAS server 20 to a NAS client 80 in response to a file access request from the NAS client 80

(hereinafter referred to as "reply packet(s)"), using information recorded in the priority calculation table 31.

The priority calculation unit 23, referring to the priority calculation table 31 (step 1601), determines whether "NO" is recorded in the status information of the storage apparatus 40 and no priority is set for the access area (step 1602). The status information of the storage apparatus 40 is a generic term referring to the configuration information (RAID level, device type), failure information (device failure, controller failure, cache failure, or cluster failover), and load information (response time, replication execution, CPU utilization, and backup execution).

If the priority is set for the access area or "YES" is recorded in the status information (step 1602: NO), the priority calculation unit 23 calculates a ToS value (or a CoS value) set for a reply packet based on the ToS value set for the IP packet (or the CoS value set for the MAC frame) received from the NAS client 80 and the status information on the storage apparatus 40 (step 1603). The method for calculating the priority set for a reply packet will be described below.

Meanwhile, if no priority is set for the access area and "NO" is recorded in the status information (step 1602: YES), the priority calculation unit 23 sets the same value for the priority of the reply packet as the ToS value set for the IP packet (or the CoS value set for the MAC frame) received from the NAS client 80, (step 1604).

Next, the method for calculating the priority set for a reply packet will be described. For ease of explanation, priority is defined as follows:
(1) The smaller is the priority value, the higher is the actual priority; and
(2) A priority value shall be a natural number greater or equal to 1.

According to the above definitions, the priority "1" is the highest priority. However, the above definitions are only for ease of explanation, and the embodiments of the present invention is not limited to the above definitions.

Here, assuming that P1 is the priority of a reply packet sent from the NAS server 20 to a NAS client 80 (ToS value or CoS value), P2 is the priority of an IP packet received by the NAS server 20 from the NAS client 80 (ToS value or CoS value recorded in the priority calculation table 31), P3 is the priority set for the access area that is the target of a file access request (priority recorded in the priority calculation table 31), and P4 is status information on the storage apparatus 40 (configuration information, failure information or load information recorded in the priority calculation table 31), P1 can obtained by the following calculation formula:

$$P1 = K1 \times P2 \times L1 \times P3 \times M1 \times P4$$

Here, K1, L1, and M1 are weighting factors, which are natural numbers greater or equal to 1. For example, when prioritizing priority P3 is set for the access area in calculating P1, the value of L1 may be set to a value larger than the values of K1 and M1. Which information, i.e., the ToS value or CoS value, is adopted as the P1 value is determined based on information in the "QoS CONTROL" column of the management table 30.

Also, assuming that P5 is configuration information, P6 is failure information, and P7 is load information, P4 can be obtained by calculation in accordance with the following formula:

$$P4 = K2 \times P5 \times L2 \times P6 \times M2 \times P7$$

Here, K2, L2, and M2 are weighting factors, which are natural numbers greater or equal to 1. For example, when prioritizing failure information P6 in calculating P4, the L2 value may be set to be larger than the values of K2 and M2.

The configuration information P5 value can be obtained as follows:

$$P5 = [\text{RAID level}] \times [\text{device type}]$$

[RAID level]=1: RAID 0
[RAID level]=2: RAID 0/1
[RAID level]=3: RAID 1
[RAID level]=4: RAID 5
[RAID level]=5: RAID 6
[device type]=1: FC disk
[device type]=3: SATA disk The configuration information P6 value can be obtained as follows:

P6=[device failure]×[controller failure]×[cache failure]×[cluster failover]
[device failure]=1: no device failure exists
[device failure]=5: any device failure exists
[controller failure]=1: no controller failure exists
[controller failure]=5: any controller failure exists
[cache failure]=1: no cache failure exists
[cache failure]=5: any cache failure exists
[cluster failover]=1: no cluster failover exists
[cluster failover]=5: any cluster failover exists.

The load information P 7 value can be obtained as follows, by selecting the value stored in the management table 30 designated by the monitoring parameter.
P7=1: replication not executed
P7=2: replication executed
P7=1: backup not executed
P7=2: backup executed
P7=1: response time 7 mS or more
P7=2: response time less than 7 mS
P7=1: CPU utilization 50% or more
P7=2: CPU utilization less than 50%

For example, the monitoring parameter set for volume 2 is response time, and thus, P7=1.

The above-described calculation method is based on an operation method in which, assuming that file access is delayed during an failure occurring in the storage apparatus 40, the priority of reply packets is lowered considering that the delay cannot be compensated for even if the priority of the reply packets is raised. However, an operation method in which upon the occurrence of a failure in the storage apparatus 40, the priority of reply packets is raised to compensate for the file access delay can also be adopted. In this operation method, the failure information P6 value can be obtained as follows:

P6=[device failure]×[controller failure]×[cache failure]×[cluster failover]

[device failure]=5: no device failure exists;
[device failure]=1: any device failure exists;
[controller failure]=5: no controller failure exists;
[controller failure]=1: any controller failure exists;
[cache failure]=5: no cache failure exists;
[cache failure]=1: any cache failure exists;
[cluster failover]=5: no cluster failover exists;
[cluster failover]=1: any cluster failover exists The unit for re-setting the priority of reply packets based on the above calculation methods may be one packet, or one file (or one session). Performing the QoS control on a packet-by-packet basis makes it possible to perform adequate QoS control depending on the circumstances at that point in time. Performing the QoS control on a file-by-file basis makes the QoS control easier, reducing the load on the NAS server 20.

While the invention has been described with respect to a limited number of embodiments, those skilled in the art, having the benefit of this disclosure, will appreciate that other embodiments can be devised which do not depart from the scope of the invention as disclosed herein. Various aspects and/or components of the described embodiments may be used singly or in any combination in the computerized storage system. Accordingly, the scope of the invention should be limited only by the attached claims.

What is claimed is:

1. A storage system operable to process an access request from a client, the storage system comprising:
    a priority calculation unit operable to calculate a priority set for a reply packet returned to the client as a response to the access request from the client, based on a priority set in advance for an access area that is the target of the access request; and
    wherein upon occurrence of a failure in the storage system, the priority calculation unit is further operable to set the priority of the reply packet to be higher than a value set when no failure occurs in the storage system.

2. A storage system according to claim 1, wherein said priority calculation unit is operable to calculate a priority set for a reply packet returned to the client as a response to the access request from the client, based on status information on the storage system.

3. The storage system according to claim 2, wherein the status information comprises any of configuration information on one or more storage devices that provide an access area, load information on the storage system, and failure information on the storage system.

4. The storage system according to claim 3, wherein the priority calculation unit, upon occurrence of a failure in the storage system, is operable to set the priority of the reply packet to be lower than a value set when no failure occurs in the storage system.

5. A communication control method having transmission priority control for packets transmitted from a storage system to a client, comprising the steps of:
    receiving at the storage system an access request from the client;
    calculating a priority set for a reply packet returned to the client as a response to the access request from the client, based on a priority set in advance for an access area that is the target of the access request;
    returning the reply packet to the client; and
    upon occurrence of a failure in the storage system, setting the priority of the reply packet to be higher than a value set when no failure occurs in the storage system.

6. The communication control method according to claim 5, further comprising a step of calculating the priority set for the reply packet based on status information on a storage system.

7. The communication control method according to claim 6, wherein the status information includes any of configuration information on one or more storage devices that provide the access area, load information on the storage system, and failure information on the storage system.

8. The communication control method according to claim 7, further comprising a step of, upon occurrence of a failure in the storage system, setting the priority of the reply packet to be lower than a value set when no failure occurs in the storage system.

* * * * *